April 30, 1929.  J. A. JOHNSON  1,710,827
VALVE OPERATING LEVER
Filed Jan. 14, 1928
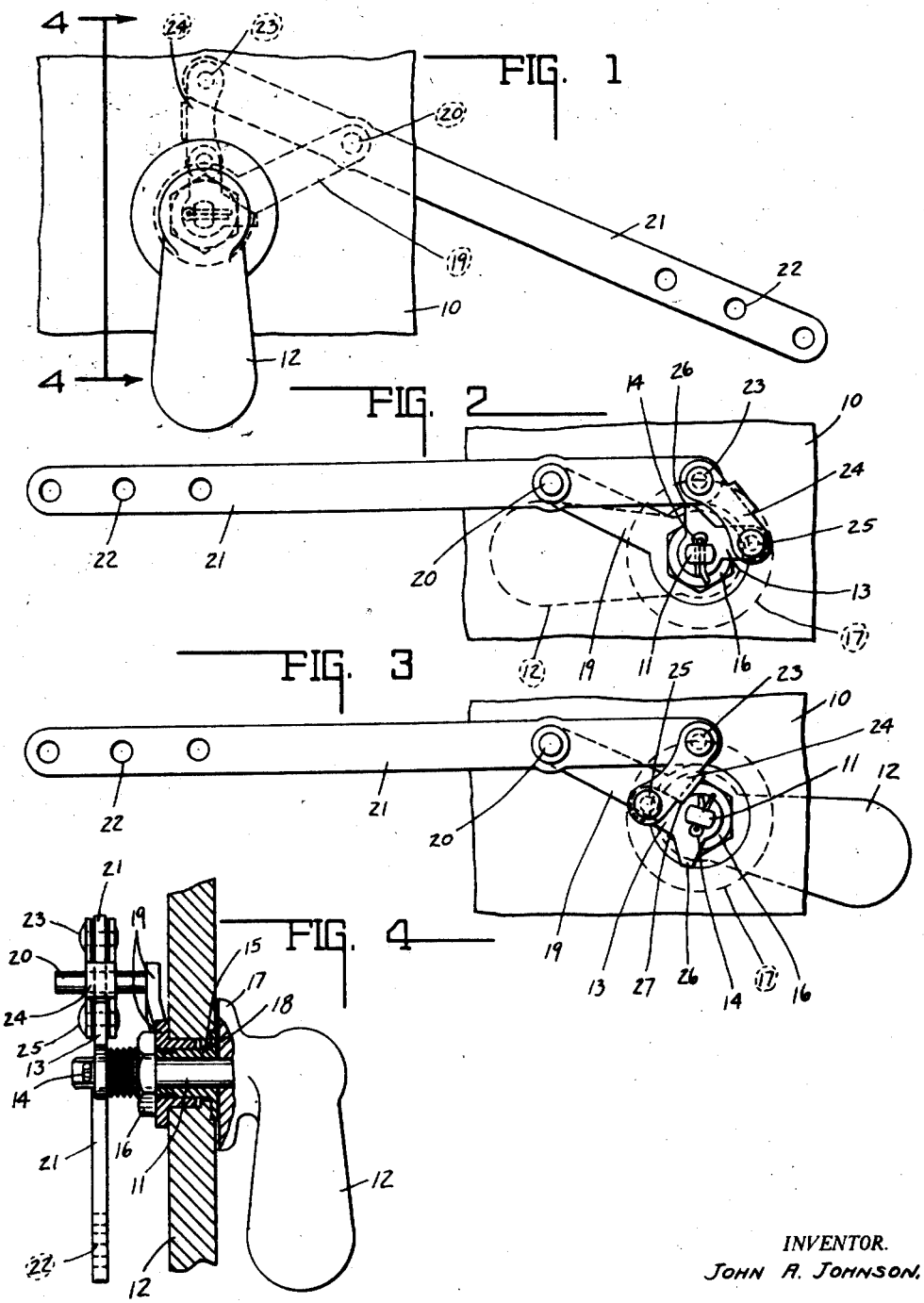
INVENTOR.
JOHN A. JOHNSON.
BY
ATTORNEYS.

Patented Apr. 30, 1929.

1,710,827

UNITED STATES PATENT OFFICE.

JOHN A. JOHNSON, OF FRANKFORT, INDIANA, ASSIGNOR TO INDIANA BRASS COMPANY, OF FRANKFORT, INDIANA, A CORPORATION.

VALVE-OPERATING LEVER.

Application filed January 14, 1928. Serial No. 246,809.

This invention relates to a valve lever particularly adapted for use in connection with flushing tanks for toilets and the like.

The principal object of the invention is to provide a lever actuating device of simple construction which will positively limit and stop the upward movement of the lever while permitting it to readily drop to lowered position, wherein the valve control handle is double acting.

This is accomplished by means of the formation and arrangement of the operating parts as will be hereafter more fully set forth and described.

The full nature of the invention will be understood from the accompanying drawing and the following description and claims.

Fig. 1 is a front elevation showing the lever and the operating handle mounted on a portion of the tank. Fig. 2 is a rear elevation showing the lever and operating handle in dotted lines in extreme operated position with the handle extending in one direction. Fig. 3 is the same as Fig. 1 showing the handle in the opposite extreme position. Fig. 4 is a section taken on the line 4—4 of Fig. 1.

In the drawings there is shown a portion of the wall of a tank 10 for containing a quantity of water controlled by a suitable valve for flushing toilets and the like. Extending through the wall of the tank there is a shaft 11 having one end secured within the operating handle 12 and the other end operatively connected with the arm 13 which is held thereon by the cotter pin 14. Said shaft extends through a suitable bushing 15 supported by the wall of the tank 10 and screw threaded at one end to receive the lock nut 16. Intermediate the flange portion 17 of the handle 12 and the face of the tank there is a washer 18, and intermediate the nut 16 and the opposite face of the tank there is fixedly mounted a bracket arm 19 having a pin 20 upon which the lever 21 is fulcrumed.

The far end of the lever 21 is provided with a plurality of holes 22 for receiving a connecting rod to a valve not shown herein, whereby said valve will be raised or lowered thereby. The near end of the lever is pivotally connected at 23 with the link 24, said link having its other end pivotally connected at 25 with the arm 13.

By reason of this construction, as the handle 12 is swung in either direction from its downward position to a substantially horizontal position, it rotates the arm 13 so as to pull down on the near end of the lever 21 through the medium of the link 24, as best shown in Figs. 2 and 3. This movement elevates the far end for raising the valve. Upon the handle dropping down to a vertical position, as shown in Fig. 1, the far end of the lever 21 is lowered so as to lower the valve.

The arm 13 is provided with a projection 26 which is so arranged as to engage the under surface of the lever 21 when the handle is moved to horizontal position, as shown in Fig. 2. Such engagement acts as a stop for limiting the further movement of the handle in that direction. Upon the handle being rotated in the opposite direction a portion of the arm 13 is brought into direct engagement with the cross piece of the link 24 as indicated at 27, in Fig. 3, thereby limiting and stopping the further movement of the handle in this direction.

From the foregoing it will be noted that the handle is free to swing back and forth in either direction, but will be limited and stopped against further upward movement when it reaches substantially horizontal position, and at this limitation of the movement is effected in a simple manner by the formation of the projecting portion 26 on the arm 13, and the cross portion or saddle extending between the two members of the link 24.

The invention claimed is:

1. In a device of the character described, a valve operating lever fulcrumed intermediate its ends, an operating handle, an arm connected with said handle, a link connecting said arm and one end of said lever, and a projection formed on said arm for engaging said lever and limiting the operative movement of the handle in one direction.

2. In a device of the character described, a valve operating lever fulcrumed intermediate its ends, an operating handle, an arm connected with said handle, a link pivotally connected to said arm and connecting said arm and one end of said lever, and a stop member formed on said link for providing a transverse surface against which said arm is adapted to engage for limiting the operative movement of the handle in one direction.

3. In a device of the character described, a valve operating lever fulcrumed intermediate its ends, an operating handle, an arm connected with said handle, a link connecting said arm and one end of said lever, and a projection formed on said arm for engaging said lever and limiting the operative movement of the handle in one direction, said link having two spaced portions positioned on opposite sides of the arm and lever, and a saddle portion extending between said link portions and formed integral therewith against which said arm is adapted to abut and limit the operative movement of the handle in one direction.

4. In a device of the character described, a valve operating lever fulcrumed intermediate its ends, an operating handle rotatably mounted with respect to said lever, an arm connected with said handle for rotating therewith, a link connecting the free end of said arm with the adjacent end of said lever whereby said lever will be raised and lowered upon the rotation of said handle, and means for limiting the rotating movement of said handle in either direction by the contact and engagement of said arm with said lever when in one position and with said link when in the opposite position.

5. A device of the character described, a valve operating lever fulcrumed intermediate its ends, a rotatably mounted operating handle, an arm connected with said handle and adapted to rotate therewith, a link formed of two members pivotally connected to opposite sides of the lever and arm and having a saddle piece connecting said members intermediate their ends for engaging said arm and limiting the rotary movement of said handle in one direction, and a projection on said arm for engaging the lever and limiting the rotary movement of the handle in the opposite direction.

In witness whereof, I have hereunto affixed my signature.

JOHN A. JOHNSON.